United States Patent [19]

Burg

[11] Patent Number: 6,012,762
[45] Date of Patent: *Jan. 11, 2000

[54] DRAG REDUCING AEROSTABILIZER FOR PICKUP TRUCKS

[76] Inventor: Donald E. Burg, 15840 SW. 84th Ave., Miami, Fla. 33157

[ * ] Notice: This patent is subject to a terminal disclaimer.

[21] Appl. No.: 09/247,291

[22] Filed: Feb. 9, 1999

Related U.S. Application Data

[63] Continuation-in-part of application No. 08/638,977, Apr. 25, 1996, Pat. No. 5,688,020, and a continuation-in-part of application No. 08/933,543, Sep. 19, 1997, Pat. No. 5,871,254.

[51] Int. Cl.⁷ ................................................. B62D 35/00
[52] U.S. Cl. ...................................... 296/180.1; 296/57.1
[58] Field of Search ........................... 296/180.1, 180.2, 296/180.5, 50, 51, 57.1; 188/270

[56] References Cited

U.S. PATENT DOCUMENTS

| | | | |
|---|---|---|---|
| 3,000,663 | 9/1961 | Lucchesi | 296/180.5 |
| 4,863,213 | 9/1989 | Deaver et al. | 296/180.1 |
| 5,076,636 | 12/1991 | Buck et al. | 296/180.1 |
| 5,607,199 | 3/1997 | Gill | 296/180.1 |
| 5,871,254 | 2/1999 | Burg | 296/180.1 |

*Primary Examiner*—Dean J. Kramer
*Attorney, Agent, or Firm*—Robert J. Van Der Wall

[57] ABSTRACT

Presented is a pickup truck tailgate mounted aerostabilizer wing that moves with the tailgate and is therefore out of the way when the tailgate is opened for cargo loading. The aerostabilizer wing is mounted distal from the tailgate by, in its preferred embodiment, use of low drag airfoil shaped stanchions that are attached to forward and upper portions of the tailgate. Other attachment approaches including attachment to rear and/or upper portions of the tailgate and/or use of adjustable or specially fitted attachment systems are also presented. The nose of the aerostabilizer wing is angled down so that the aerostabilizer wing acts as a turning vane to direct pressurized air from an aerodynamic pressure front that builds up on the forward side of the tailgate at highway speeds up and out over the top of the tailgate thereby reducing drag. Due to its downwardly angled and at least partially airfoil shaped design, the aerostabilizer wing also places a downward force on the tailgate thus helping to stabilize the pickup truck when traveling forward. Limitations on the downward angle of the nose of the aerostabilizer wing and of the gap distance between the aerostabilizer wing and the tailgate are established. End treatments of the aerostabilizer wing in both spanwise and chordwise directions are also given. The instant invention aerostabilizer wing and its mounting stanchions are all, in their preferred embodiments, at least partially airfoil shaped to insure a simple yet strong and appealing structure that offers minimum aerodynamic resistance. An optional aerostabilizer wing insert that can extend the spanwise length of the aerostabilizer wing and can include a light or reflector is also offered.

36 Claims, 5 Drawing Sheets

DRAG REDUCING AEROSTABILIZER FOR PICKUP TRUCKS

CROSS REFERENCE TO OTHER APPLICATIONS

This application is a continuation-in-part to applicant's earlier applications Ser. No. 08/638,977 filed Apr. 25, 1996 now U.S. Pat. 5,688,020 issued Nov. 18, 1997 and Ser. No. 08/933,543 filed Sep. 19, 1997 now U.S. Pat. No. 5,871,254 issued Feb. 16, 1999.

BACKGROUND OF THE INVENTION

The instant invention describes a tailgate mounted drag reducing aerodynamic stabilizer or aerostabilizer wing for a pickup truck. This aerostabilizer wing is mounted on the pickup truck's tailgate so that it moves with the tailgate and as such is out of the way when the tailgate is opened for carrying cargo. It is disposed distal from the tailgate, over at least a majority of its span, so that, when the pickup truck is moving forward, it acts to: 1) place a downward aerodynamic generated force on the aft end of the cargo bed of the pickup truck and 2) reduce drag of the pickup truck since an aerodynamic pressure front that builds up on the forward side of the tailgate is at least partially bled off through an especially configured opening between the aerostabilizer wing and the tailgate. This is all done with a very attractive aerodynamically shaped unit that lends itself to low cost manufacture and that also offers high strength and easy installation.

SUMMARY OF THE INVENTION

With the foregoing in mind, it is the principal object of the present invention to offer a simple yet attractive and low cost tailgate mounted aerodynamic stabilizer in the form of an aerostabilizer wing mounted to and at least in its majority distal from the tailgate of a pickup truck that places an aerodynamic downward force on the tailgate and hence on the aft end of the cargo bed of the pickup truck when the pickup truck is moving forward.

It is a preferred embodiment of the invention is that the aerostabilizer wing be disposed, at least in its majority, above and aft of a forward upper portion of the tailgate.

Another principal object of the invention is that, since the aerostabilizer wing is attached to the tailgate, it swings out of the way of cargo when the tailgate is opened.

It is a further principal object of the invention that the aerostabilizer wing be especially configured and mounted such that it also acts to help reduce the aerodynamic drag created by a buildup of aerodynamic pressure on the front side of the tailgate by aspirating such aerodynamic pressure front out and over the top of the tailgate when the pickup truck is moving forward.

It is a directly related object of the invention that there be an air gap between the aerostabilizer wing and the tailgate so that air can flow out between the top of the tailgate the underside of the aerostabilizer wing.

It is a related object of the invention that the just mentioned air gap should be, on average over the span of the aerostabilizer wing, at least one half inch with a minimum of one inch preferred.

It is a directly related object of the invention that, in the preferred embodiment of the invention, the previously mentioned air gap be, on average, at least two inches.

It is a further object of the invention that a nose of said aerostabilizer wing be angled downward from horizontal, as seen when the tailgate is in its closed or vertical orientation, to thereby act as a turning vane and direct air movement from the cargo bed out over the tailgate.

A directly related object of the invention is that a downward angle of a nose of the aerostabilizer wing, as seen with the tailgate in its closed or vertical position, be on average over its swanwise width, at least 40 degrees from a horizontal plane.

A directly related object of the invention is that the just previously described downward angle be at least 55 degrees.

A further refinement and a directly related object of the invention is that the just previously described downward angle be at least 65 degrees.

It is a yet another object of the invention that the aerostabilizer wing be, at least in part, airfoil shaped.

It is a related object of the invention that the chord of the aerostabilizer wing be cambered.

It is a further object of the invention that the chord of the aerostabilizer wing can be truncated.

It is a related object of the invention that the spanwise ends of the aerostabilizer wing may be turned down.

It is an optional related object of the invention that the spanwise ends of the aerostabilizer wing can include more vertically than horizontally oriented flow directing wing end caps.

It is a further object of the invention that the aerostabilizer wing is connected to the tailgate by one or more stanchions.

It is a directly related object of the invention that such stanchion(s), as seen in a horizontal plane taken through a stanchion and with the tailgate in its closed or vertical orientation, are, at least in part, airfoil shaped.

It is a related object of the invention that the stanchions will, in the preferred embodiment, be attached to a forward upper portion of the tailgate.

A directly related object of the invention is that the stanchions can be attached to other portions of the tailgate including the tailgate's upper and/or aft surfaces.

It is another related object of the invention that an adjustable attachment member can be used to aid in attaching the aerostabilizer to a pickup truck's tailgate.

A further object of the invention is that it can include a light, such as a stoplight, or a reflector.

Yet another object of the invention is that it can be made in several pieces with a preferred embodiment having an aerostabilizer wing insertable section that is ideally inserted into the aerostabilizer wing such that said aerostabilizer wing insertable section can be made of different lengths to accommodate different width tailgates.

It is a further object of the invention that the stanchion(s) and the aerostabilizer wing can be made as separate pieces and attached at assembly.

Yet another object of the invention is that the aerostabilizer wing insertable section can include a light and/or reflector.

A further object of the invention is that the aerostabilizer wing be of a hollow construction.

A directly related object of the invention is that hollow sections of the aerostabilizer wing and/or the stanchions can be filled or cored with a structural material such as plastic foam.

It is a directly related object of the invention that forward portions of the stanchions extend over upper portions of the aerostabilizer wing so as to protect the aerostabilizer wing when the tailgate is down or open and cargo that extends beyond the tailgate is being transported.

The invention will be better understood upon reference to the drawings and detailed description of the invention which follow in which:

DETAILED DESCRIPTION

Figure 1:
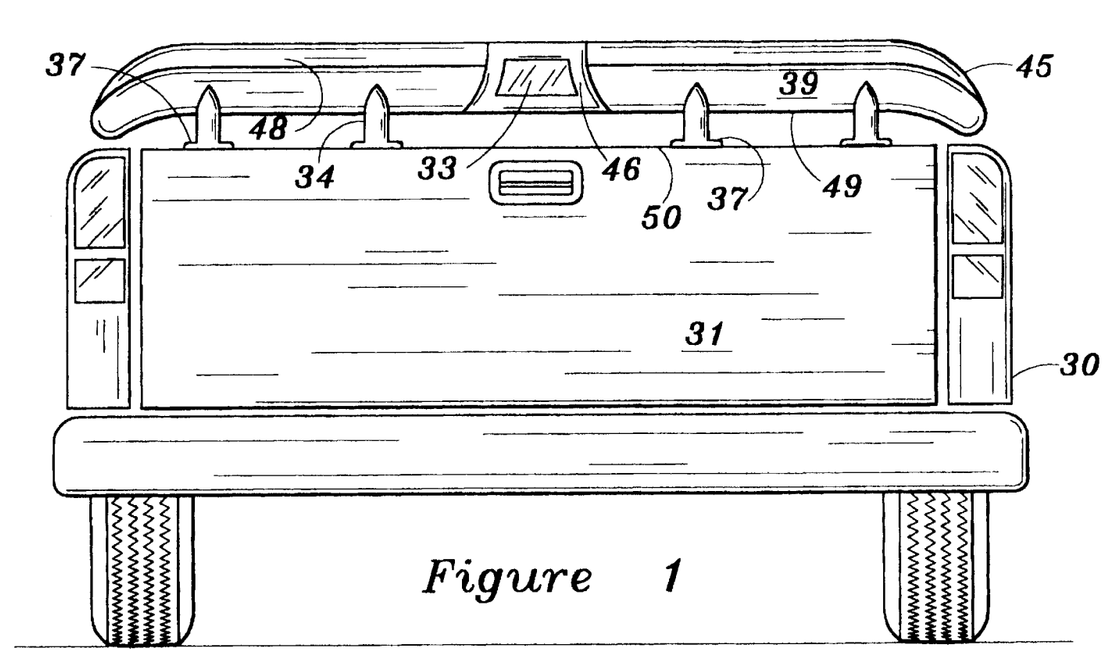
FIG. 1 presents a rear view of a pickup truck showing the inventive tailgate mounted pickup truck aerostabilizer which, in this instance, includes a stoplight.

FIG. 1 presents a rear view of a pickup truck 30 that has an aerostabilizer assembly 45 including aerostabilizer wing 39 installed on the pickup truck's tailgate 31. The aerostabilizer wing 39 is above the tailgate upper surface 50 in this preferred embodiment of the invention. Note that the aerostabilizer wing 39 as shown here includes an aerostabilizer wing insert 46 that, optionally, has a built in light such as a stoplight 33. The aerostabilizer wing 39 is supported by stanchions 34 that can, in the preferred embodiment, include stanchion upper mounting brackets 37. Note that, as can be seen by review of FIGS. 7 through 10, the aerostabilizer wing aft end 48, in the preferred embodiment of the instant invention, is made to be truncated with a more vertical than horizontal orientation. This truncating of the chord of the aerostabilizer's airfoil shape on its aft end results in a more rugged and durable unit and also accelerates flow on the underside of the aerostabilizer wing 39. The aerostabilizer wing's nose 49 is also shown.

Figure 2:
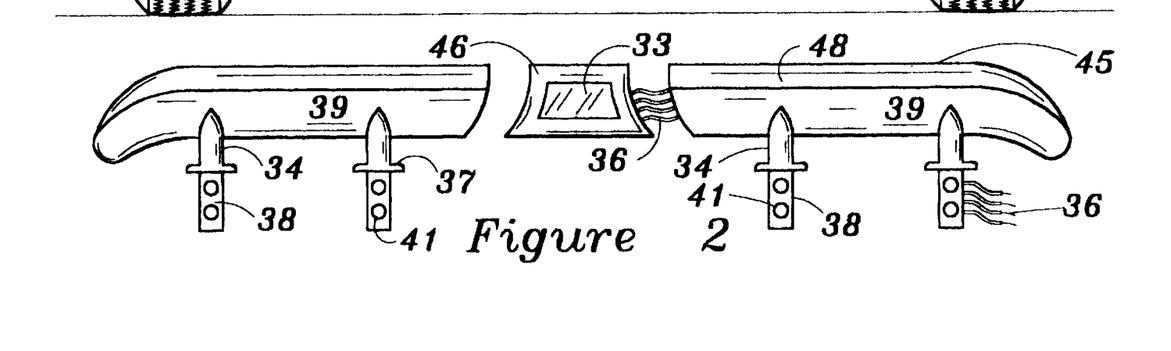
FIG. 2 is an exploded view of the aerostabilizer shown in FIG. 1. In this case, the aerostabilizer assembly is composed of three pieces. The insertable piece, in this case in the center, can be made of different lengths to accommodate different tailgate widths. It is to be noted that, while not shown as such here, the stanchions can be separate pieces to be connected at assembly of the complete unit.

FIG. 2 discloses an exploded view of the aerostabilizer assembly 45 presented in FIG. 1. This exploded view of the aerostabilizer assembly 45, shown without the tailgate, also illustrates the light's electrical wires 36, lower mount brackets 38, and fastener holes 41.

Figure 3:
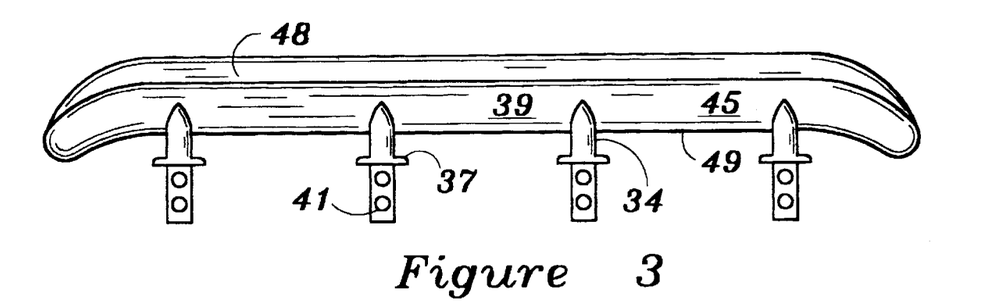
FIG. 3 presents a rear view of a simple one piece aerostabilizer showing the preferred arrangement consisting of four stanchions that support the aerostabilizer wing and separate it from the tailgate.

FIG. 3 gives a rear view of a simpler version of the aerostabilizer assembly 45 that does not include an aerostabilizer wing insert. This preferably one piece unit is simple in concept and inherently strong in structure. It can alternatively be made in several pieces which might utilize four independent stanchions 34 that would be attached to a separately manufactured aerostabilizer wing 39.

Figure 4:
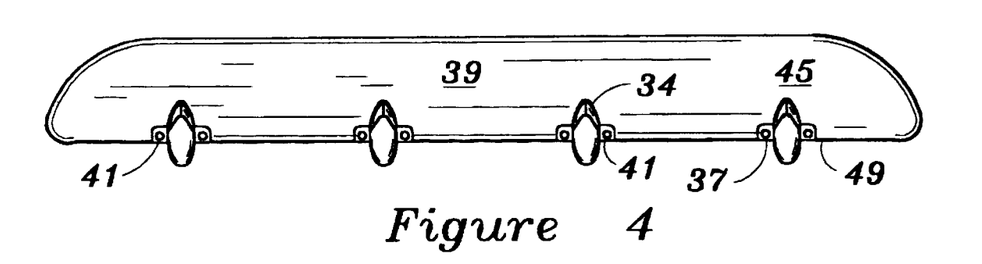
FIGS. 4, 5, and 6 are respectively bottom, front, and top views of the aerostabilizer assembly presented in FIG. 3.
Figure 5:
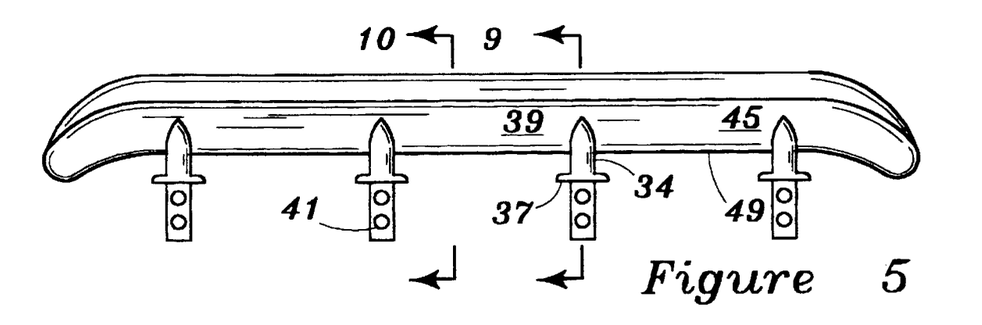
Figure 6:
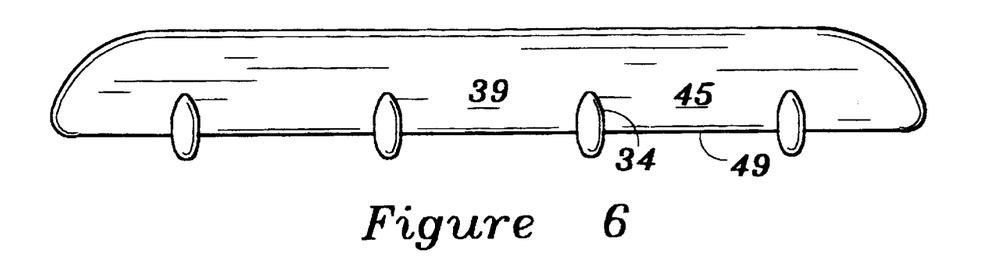

FIGS. 4, 5, and 6 show bottom, front, and top views, respectively, of the aerostabilizer assembly presented in FIG. 3.

Figures 7, 8, 9:
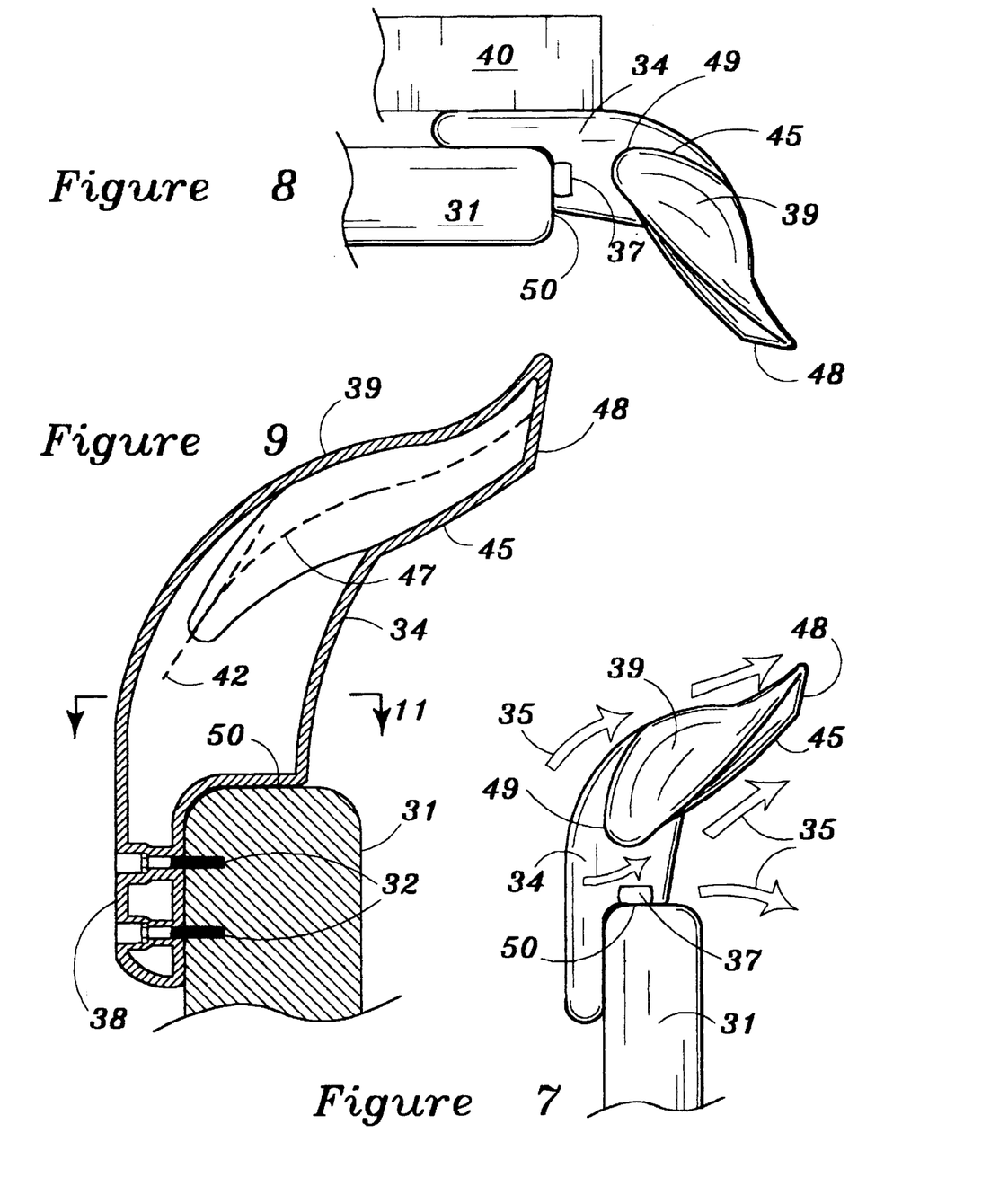
FIG. 7 is a side view of the aerostabilizer assembly presented in FIGS. 1 through 6 as shown mounted on a tailgate that is in its closed or vertical orientation. Note the air flow arrows both above and below the aerostabilizer wing. The upper air flows show how a downward aerodynamic force is generated on the tailgate while the lower air flow arrows show the aspiration of an aerodynamic pressure front that builds up forward of the tailgate. The advantages of both are, of course, most pronounced with the pickup truck traveling forward at highway speeds.
FIG. 8 is the same side view as presented in FIG. 7 but with the tailgate lowered and with a piece of cargo, in this case a board or door, extending out past the tailgate. Note that the board or door rests on the front of the aerostabilizer assembly's stanchions so that the surface of the aerostabilizer wing itself is not scratched in this preferred embodiment.
FIG. 9 presents a cross-sectional view, as taken through line 9—9 of FIG. 5 but with a portion of a tailgate also shown for illustrative purposes, that gives details of the preferred structure of a stanchion and the aerostabilizer wing and how the preferred embodiment mounting to the tailgate is accomplished.

FIG. 7 shows an end view of the aerostabilizer assembly 45 presented in FIGS. 1 through 6 as mounted on a tailgate 31. Note the air flow arrows 35. The air flow arrows 35 above the aerostabilizer wing 39 show air flow that results in an aerodynamic pressure acting downward on the aerostabilizer wing 39. The air flow arrows 35 disposed below the aerostabilizer wing 39 show how the aerostabilizer wing 39 acts as a flow turning or directing vane to enhance air flow out from the pressure front that builds up forward of the tailgate at highway speeds. It is to be noted that, while not shown in such configuration. an aerostabilizer wing forward portion 49 can actually be lower than a tailgate upper surface 50 so long as an air gap exists between the tailgate 31 and the aerostabilizer wing 39 and the aerostabilizer wing 39 helps direct air up and out over the tailgate 31.

FIG. 8 offers the same view as FIG. 7 except the tailgate 31 is in its lowered or cargo carrying orientation. Note the cargo 40 which in this instance is a piece of plywood, a door, or some such item that extends aft of the tailgate 31. Note also that, in the preferred embodiment, the forward end of the stanchion 34 essentially covers and protects the aerostabilizer wing 39 from contact with the cargo 40 thus preventing scratching of the aerostabilizer wing 39.

FIG. 9 is a cross-sectional view, as taken through line 9—9 of FIG. 5 but also including a portion of a tailgate 31, of an aerostabilizer assembly 45. Note that the airfoil shaped aerostabilizer wing 39 has a chord 47 that is cambered in this preferred embodiment of the instant invention. Other shapes including airfoil designs without camber are, of course, also considered within the scope of the instant invention. Also, note that the aerostabilizer wing is truncated in its chordwise direction with the aerostabilizer wing's aft surface 48 oriented more vertically than horizontally. This truncating of the aerostabilizer wing 39 results in a rugged yet attractive structure and also increases the acceleration of air flow under the aerostabilizer wing 39. The downward angling of the forward end of the aerostabilizer wing 39 is shown by its median nose angle line 42. FIG. 9 also shows tailgate attachment fasteners 32.

Figures 10, 11:
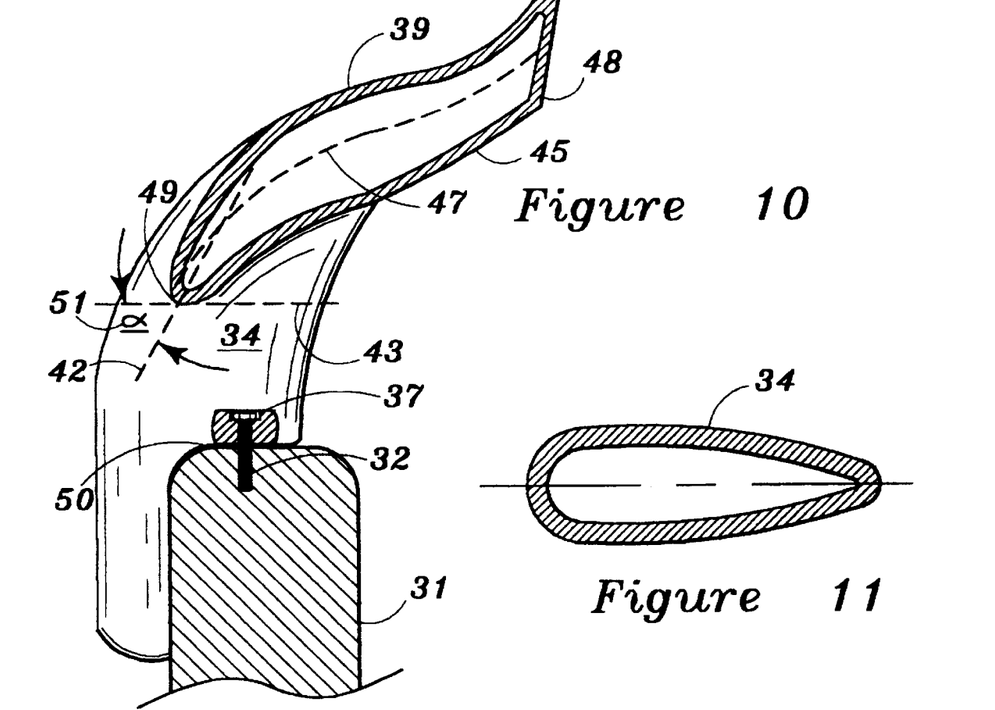
FIG. 10 presents a cross-sectional view, as taken through line 10—10 of FIG. 5, that shows the preferred orientation of the aerostabilizer wing relative to the tailgate. It also shows an upper mounting bracket.
FIG. 11 is a cross section of a stanchion, as taken through horizontal line 11—11 of FIG. 9, that illustrates the preferred embodiment airfoil shaped stanchion.

FIG. 10 presents a cross-sectional view, as taken through line 10—10 of FIG. 5 but including a portion of a tailgate 31, that shows details of a stanchion upper mounting bracket 37. More importantly, note the downward angle of the aerostabilizer wing's nose 49 that is referred to as the aerostabilizer wing's nose downward angle ($\alpha$) 51. This aerostabilizer wing's nose downward angle ($\alpha$) 51 is defined as being between the aerostabilizer wing's median nose angle line 42 and a horizontal plane 43 as taken proximal a forward side of the tailgate 31 with the tailgate in its upright or closed orientation. Airflow tests have shown that this aerostabilizer's nose downward angle ($\alpha$) 51 should be at least 40 degrees with at least 55 degrees a preferred angle limitation and at least 65 degrees still acceptable. It is also important that a gap between the tailgate 31 and the spanwise underside of the aerostabilizer wing 39 be set at minimum values to insure proper airflow under the aerostabilizer wing 39. This gap has been established as preferably being at least two inches with values as low as one inch or even one half inch workable in some instances.

FIG. 11 is a cross-section, as taken through horizontal line 11—11 of FIG. 9, that shows a preferred low aerodynamic resistance and attractive airfoil shaped stanchion 34.

Figure 12:
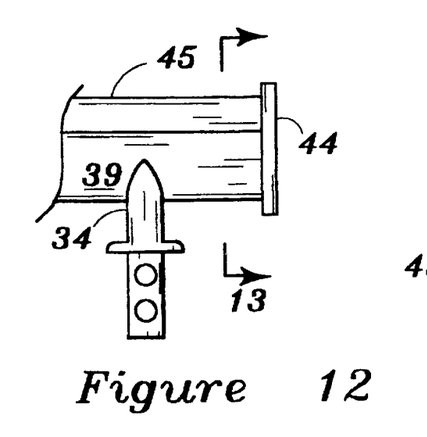
FIG. 12 is a partial view from the rear of an aerostabilizer assembly with an optional more vertically than horizontally oriented wing end cap on one end of the aerostabilizer wing's span.

FIG. 12 presents a partial rear view of an alternative way to treat the spanwise ends of an aerostabilizer wing. In this case wing end caps 44 that are more vertically than horizontally oriented are used. This approach is simple and makes for more efficient airfoil action as the wing end caps 44 reduce air spillage. It is to be noted that the spanwise ends of the aerostabilizer wings can be simply truncated (not shown) where they would not be turned down, as shown in FIGS. 1 through 8, or have wing end caps 44, as shown in FIGS. 12 and 13, if desired.

Figure 13:
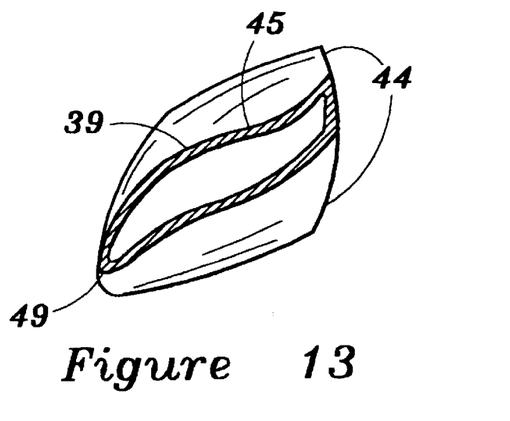
FIG. 13 is a cross-sectional view, as taken through line 13—13 of FIG. 12, that shows a cross section of the aerostabilizer wing and a vertically oriented wing end cap.

FIG. 13 is a cross-sectional view, as taken though line 13—13 of FIG. 12, that shows a wing end cap 44 as mounted to and its preferred orientation to the aerostabilizer wing 39.

Figures 14, 15:
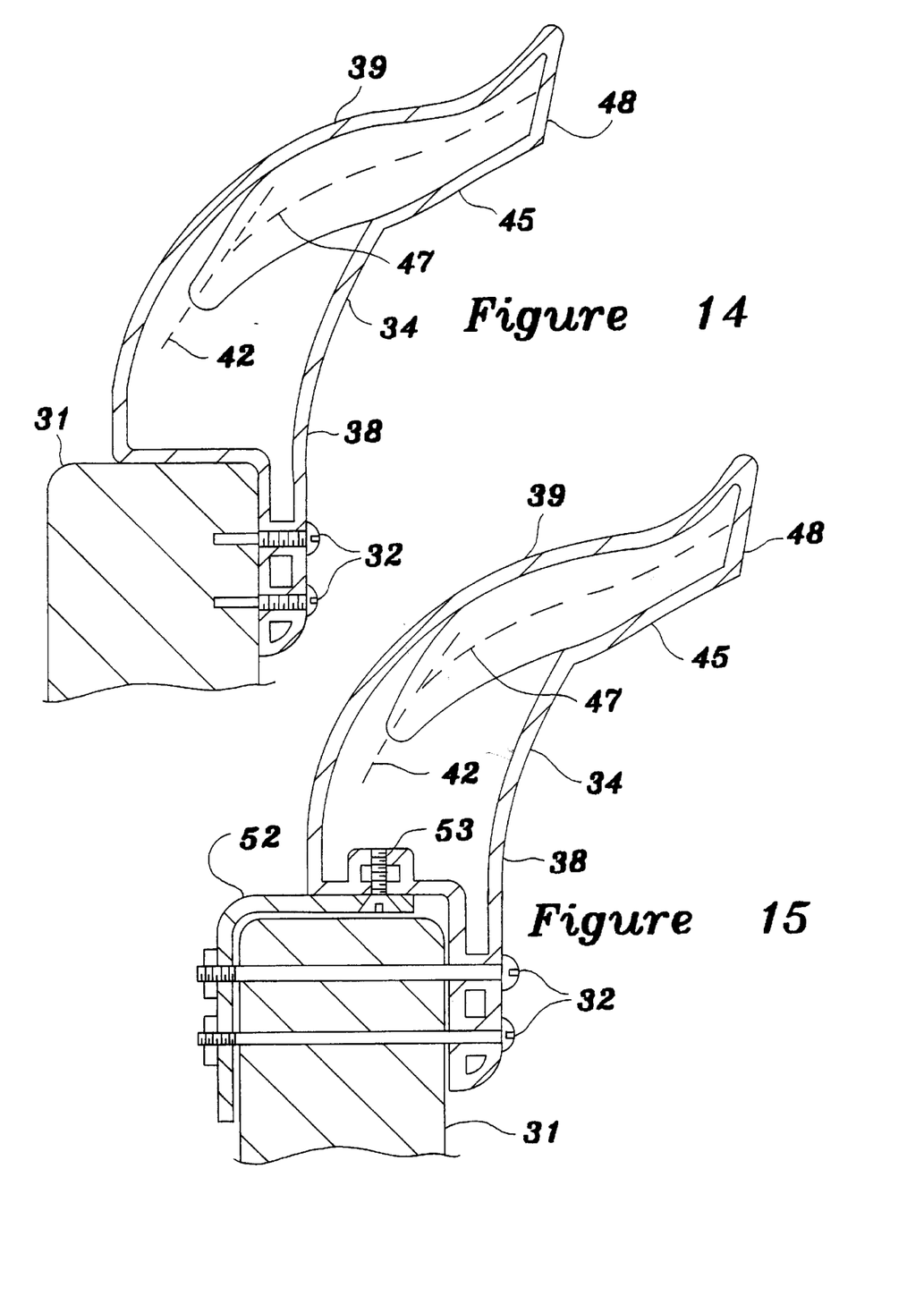
FIG. 14 shows an alternative attachment whereby at least some of the attachment fasteners attach to a rear portion of the pickup truck tailgate.
FIG. 15 presents yet another means of attachment whereby an adjustable bracket or similar means that adapts to all manner of pickup truck tailgate thicknesses can be used to give a straddle mount to an upper portion of the pickup truck tailgate.

FIG. 14 presents, in a similar cross-sectional view as earlier presented in FIG. 9, an alternative attachment means where fasteners 32 attach from a rear side of the pickup truck tailgate 31.

FIG. 15, also presented in a similar cross-sectional view as earlier presented in FIG. 9, shows another attachment system whereby an adjustable attachment means, in this case in the form of a bracket 52, adjusts to fit the width of a particular pickup truck tailgate. In this particular configuration, an adjustment screw 53 is tightened when the proper width is established. It is to be noted that a series of tailgate adapter brackets that would be similar to the bracket 52 shown but preferably in a full U-shape, not shown, can be utilized. In such case, a special bracket would be needed for each manufacturer's pickup truck tailgate.

While the invention has been described in connection with a preferred and several alternative embodiments, it will be understood that there is intended to be covered all alternatives, modifications and equivalents as may be included within the spirit and scope of the invention as defined by the appended claims, which are the sole definition of the invention.

What I claim is:

1. In an improved pickup truck including a cargo bed and an opening tailgate positioned proximal an aft end of said cargo bed, the improvement comprising:

an aerostabilizer in mechanical communication with said tailgate such that said aerostabilizer moves with the tailgate during opening and closing of said tailgate, said aerostabilizer positioned, at least in its majority, above and proximal to said tailgate, as seen with the tailgate in its closed or vertical orientation, and also, at least in its majority, aft of a forward portion of said tailgate, as seen with the tailgate in its closed or vertical orientation, whereby there is an air gap made up of one or more spanwise portions and extending over at least a majority of a spanwise width of said aerostabilizer where said air gap is disposed between said aerostabilizer and said tailgate, whereby air from a forward portion of said tailgate, when said tailgate is closed in its vertical position and the pickup truck is moving forward, passes freely through said air gap thereby relieving air pressure from a forward portion of the tailgate, and wherein said aerostabilizer is attached to the tailgate by attachment means that attaches to a rear portion of the tailgate.

2. The improved pickup truck of claim 1 wherein at least a part of the mechanical communication of the aerostabilizer and the tailgate is accomplished by a stanchion wherein said stanchion is at least in part curvilinear in shape as seen in a cross section taken horizontally through said stanchion when the tailgate is in its vertical or closed position.

3. The improved pickup truck of claim 2 wherein said stanchion is at least in part, as viewed in a horizontal plane through the stanchion when the tailgate is vertical or closed, airfoil shaped.

4. The improved pickup truck of claim 1 wherein the aerostabilizer has turned down ends at either end of its span.

5. The improved pickup truck of claim 1 wherein said air gap averages at least one inch.

6. The improved pickup truck of claim 1 wherein said air gap averages at least two inches.

7. The improved pickup truck of claim 1 wherein said aerostabilizer is, at least partially, airfoil shaped.

8. The improved pickup truck of claim 1 wherein a chord of said aerostabilizer is cambered.

9. In an improved pickup truck including a cargo bed and an opening tailgate positioned proximal an aft end of said cargo bed, the improvement comprising:

an aerostabilizer in mechanical communication with said tailgate such that said aerostabilizer moves with the tailgate during opening and closing of said tailgate, said aerostabilizer positioned, at least in its majority, above and proximal to said tailgate, as seen with the tailgate in its closed or vertical orientation, and also, at least in its majority, aft of a forward portion of said tailgate, as seen with the tailgate in its closed or vertical orientation, whereby there is an air gap made up of one or more spanwise portions and extending over at least a majority of a spanwise width of said aerostabilizer where said air gap is disposed between said aerostabilizer and said tailgate, whereby air from a forward portion of said tailgate, when said tailgate is closed in its vertical position and the pickup truck is moving forward, passes freely through said air gap thereby relieving air pressure from a forward portion of the tailgate, and wherein said aerostabilizer is attached to the tailgate by adjustable attachment means.

10. The improved pickup truck of claim 9 wherein at least a part of the mechanical communication of the aerostabilizer and the tailgate is accomplished by a stanchion wherein said stanchion is at least in part curvilinear in shape as seen in a cross section taken horizontally through said stanchion when the tailgate is in its vertical or closed position.

11. The improved pickup truck of claim 10 wherein said stanchion is at least in part, as viewed in a horizontal plane through the stanchion when the tailgate is vertical or closed, airfoil shaped.

12. The improved pickup truck of claim 9 wherein the aerostabilizer has turned down ends at either end of its span.

13. The improved pickup truck of claim 9 wherein said air gap averages at least one inch.

14. The improved pickup truck of claim 9 wherein said air gap averages at least two inches.

15. In an improved pickup truck including a cargo bed and an opening tailgate positioned proximal an aft end of said cargo bed, the improvement comprising:

an aerostabilizer in mechanical communication with said tailgate such that said aerostabilizer moves with the tailgate during opening and closing of said tailgate, said aerostabilizer positioned, at least in its majority, above and proximal to said tailgate, as seen with the tailgate in its closed or vertical orientation, and also, at least in its majority, aft of a forward portion of said tailgate, as seen with the tailgate in its closed or vertical orientation, whereby there is an air gap made up of one or more spanwise portions and extending over at least a majority of a spanwise width of said aerostabilizer where said air gap is disposed between said aerostabilizer and said tailgate, whereby air from a forward portion of said tailgate, when said tailgate is closed in its vertical position and the pickup truck is moving forward, passes freely through said air gap thereby relieving air pressure from a forward portion of the tailgate, and wherein said aerostabilizer is attached to the tailgate by attachment means that pierces the tailgate from front to rear.

16. The improved pickup truck of claim 15 wherein at least a part of the mechanical communication of the aerostabilizer and the tailgate is accomplished by a stanchion wherein said stanchion is at least in part curvilinear in shape as seen in a cross section taken horizontally through said stanchion when the tailgate is in its vertical or closed position.

17. The improved pickup truck of claim 16 wherein said stanchion is at least in part, as viewed in a horizontal plane through the stanchion when the tailgate is vertical or closed, airfoil shaped.

18. The improved pickup truck of claim 15 wherein the aerostabilizer has turned down ends at either end of its span.

19. The improved pickup truck of claim 15 wherein said air gap averages at least one inch.

20. The improved pickup truck of claim 15 wherein said air gap averages at least two inches.

21. In an improved pickup truck including a cargo bed and an opening tailgate positioned proximal an aft end of said cargo bed, the improvement comprising:

an aerostabilizer in mechanical communication with said tailgate such that said aerostabilizer moves with the tailgate during opening and closing of said tailgate, said aerostabilizer positioned, at least in its majority, above and proximal to said tailgate, as seen with the tailgate in its closed or vertical orientation, and also, at least in its majority, aft of a forward portion of said tailgate, as seen with the tailgate in its closed or vertical orientation, whereby there is an air gap made up of one or more spanwise portions and extending over at least a majority of a spanwise width of said aerostabilizer where said air gap is disposed between said aerostabilizer and said tailgate, whereby air from a forward portion of said tailgate, when said tailgate is closed in its vertical position and the pickup truck is moving forward, passes freely through said air gap thereby relieving air pressure from a forward portion of the tailgate, and wherein said aerostabilizer is attached to the tailgate by attachment means that attaches to a forward portion of the tailgate.

22. The improved pickup truck of claim 21 wherein at least a part of the mechanical communication of the aerostabilizer and the tailgate is accomplished by a stanchion wherein said stanchion is at least in part curvilinear in shape as seen in a cross section taken horizontally through said stanchion when the tailgate is in its vertical or closed position.

23. The improved pickup truck of claim 22 wherein said stanchion is at least in part, as viewed in a horizontal plane through the stanchion when the tailgate is vertical or closed, airfoil shaped.

24. The improved pickup truck of claim 21 wherein the aerostabilizer has turned down ends at either end of its span.

25. The improved pickup truck of claim 21 wherein said air gap averages at least one inch.

26. The improved pickup truck of claim 21 wherein said air gap averages at least two inches.

27. The improved pickup truck of claim 21 wherein said aerostabilizer is, at least partially, airfoil shaped.

28. The improved pickup truck of claim 21 wherein a chord of said aerostabilizer is cambered.

29. In an improved pickup truck including a cargo bed and an opening tailgate positioned proximal an aft end of said cargo bed, the improvement comprising:

an aerostabilizer in mechanical communication with said tailgate such that said aerostabilizer moves with the tailgate during opening and closing of said tailgate, said aerostabilizer positioned, at least in its majority, above and proximal to said tailgate, as seen with the tailgate in its closed or vertical orientation, and also, at least in its majority, aft of a forward portion of said tailgate, as seen with the tailgate in its closed or vertical orientation, whereby there is an air gap made up of one or more spanwise portions and extending over at least a majority of a spanwise width of said aerostabilizer where said air gap is disposed between said aerostabilizer and said tailgate, whereby air from a forward portion of said tailgate, when said tailgate is closed in its vertical position and the pickup truck is moving forward, passes freely through said air gap thereby relieving air pressure from a forward portion of the tailgate, and wherein said aerostabilizer is attached to the tailgate by attachment means that attaches to an upper portion of the tailgate.

30. The improved pickup truck of claim 29 wherein at least a part of the mechanical communication of the aerostabilizer and the tailgate is accomplished by a stanchion wherein said stanchion is at least in part curvilinear in shape as seen in a cross section taken horizontally through said stanchion when the tailgate is in its vertical or closed position.

31. The improved pickup truck of claim 30 wherein said stanchion is at least in part, as viewed in a horizontal plane through the stanchion when the tailgate is vertical or closed, airfoil shaped.

32. The improved pickup truck of claim 29 wherein the aerostabilizer has turned down ends at either end of its span.

33. The improved pickup truck of claim 29 wherein said air gap averages at least one inch.

34. The improved pickup truck of claim 29 wherein said air gap averages at least two inches.

35. The improved pickup truck of claim 29 wherein said aerostabilizer is, at least partially, airfoil shaped.

36. The improved pickup truck of claim 29 wherein a chord of said aerostabilizer is cambered.

* * * * *